May 26, 1964
A. L. MILLER
3,134,366
FLOW REGULATOR FOR A HEATER
Filed Oct. 13, 1959
2 Sheets-Sheet 1
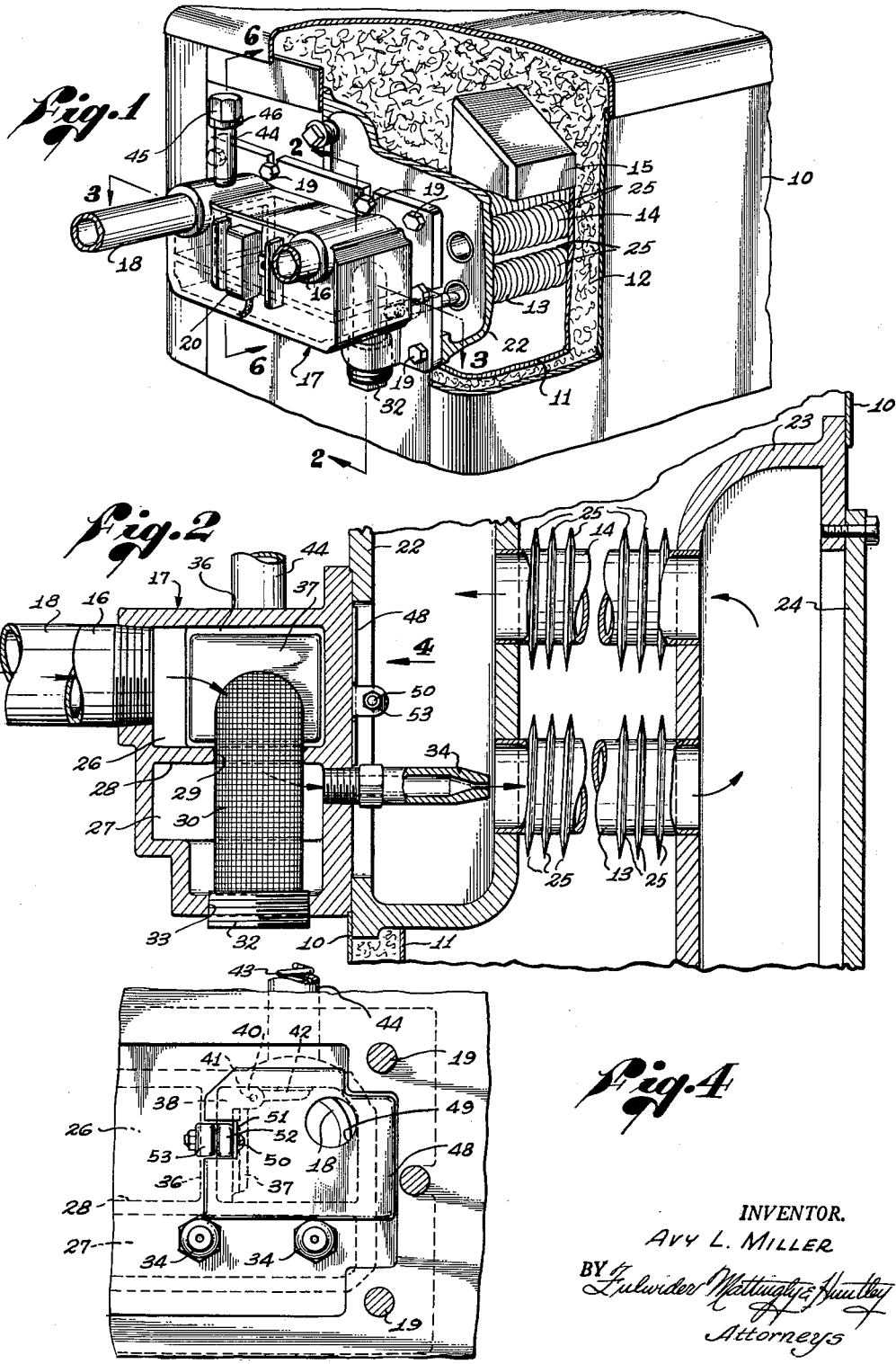
INVENTOR.
AVY L. MILLER

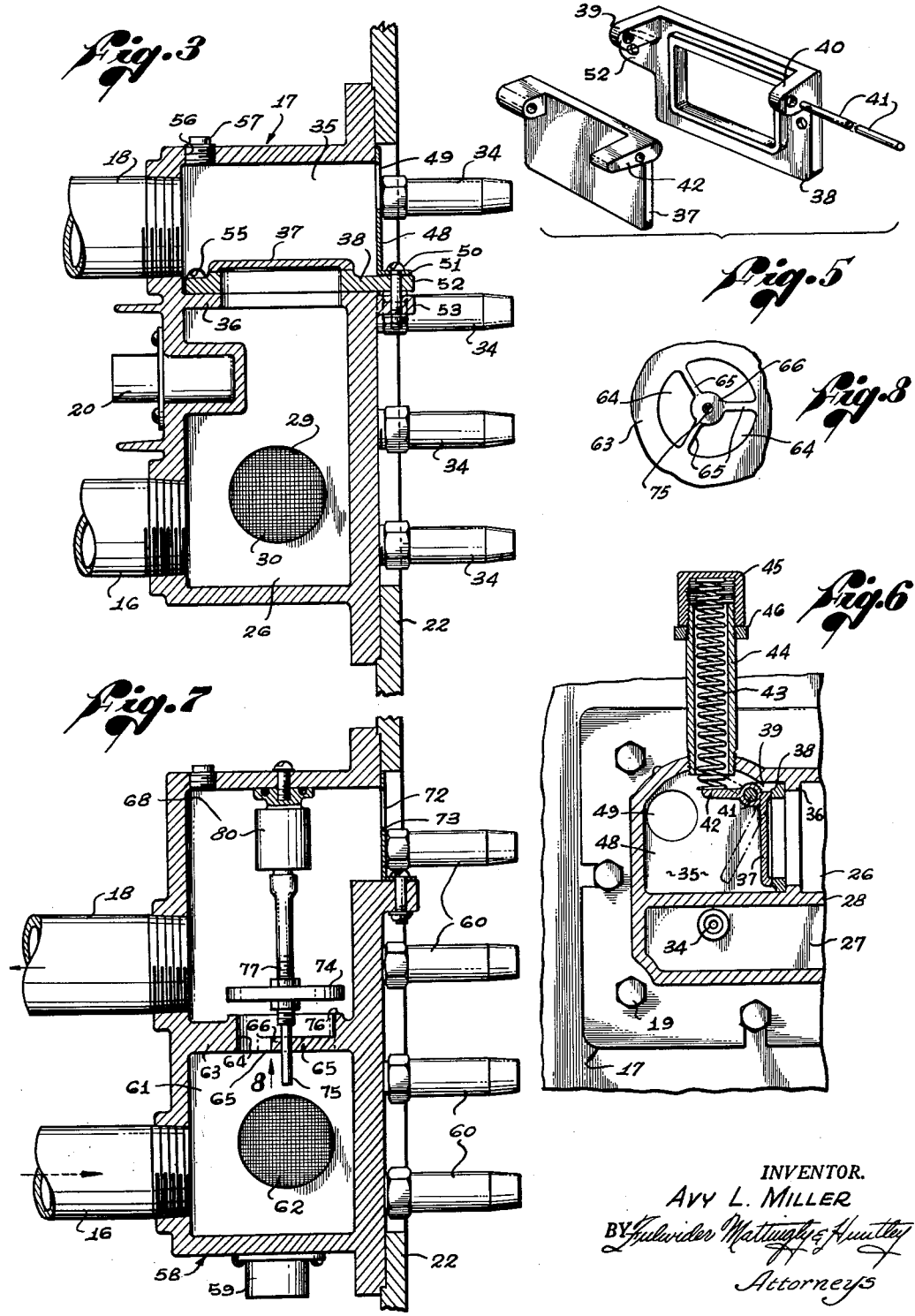

United States Patent Office 3,134,366
Patented May 26, 1964

3,134,366
FLOW REGULATOR FOR A HEATER
Avy L. Miller, 3913 Goodland Ave.,
North Hollywood, Calif.
Filed Oct. 13, 1959, Ser. No. 846,083
5 Claims. (Cl. 122—407)

The present invention relates generally to fluid heaters and, more particularly, to such devices of the continuous flow "water tube" type.

More specifically, this invention relates to a regulator for such continuous flow water heaters which will compensate for changes in the supply pressure of the fluid to be heated and thereby maintain a relatively uniform flow rate through the heater.

Continuous flow heaters are those in which fluid is heated only during the supply thereof as opposed to storage type heaters in which the fluid contained in a storage tank is maintained at the desired supply temperature and the fluid is recirculated to bring the temperature up to the desired hot fluid temperature whenever a portion of the contents of the storage tank is withdrawn.

One of the principal disadvantages encountered in the use of continuous flow heaters, particularly those which are gas fueled, is that one end of the fluid heater tube is constantly at a temperature considerably below the dew point of the combustion products surrounding the outside of the tube due to the incoming cold fluid. This causes condensation to form on the outer surface along a substantial length of the tube due to the fact that the products of combustion are heavily saturated with water vapor, and upon being cooled to the temperature of the inflowing fluid, condense out most of their moisture. This moisture drips down on the burners and the lining of the firebox causing serious corrosion problems.

Such continuous flow heaters have the further characteristic that due to the slow rate at which the fluid flows through the heating tube, the temperature of the fluid at the downstream end of the heater tube is much higher than the desired temperature. This characteristic is particularly undesirable in water heaters since, as is well known, the deposit of materials in so-called "hard" waters increases as the temperature of the water increases. These mineral deposits not only act as an insulation, and therefore greatly reduce the heat transfer efficiency of the tubes, but further within a relatively short time, the tubes may become so clogged that the entire system breaks down.

The heater disclosed in my Patent No. 2,828,723, overcomes the above-mentioned disadvantages; however, I have discovered that a further problem sometimes arises when heaters are used over a long period of time to heat the water in swimming pools. More specifically, when a continuous flow heater is used to heat the water in swimming pools, normally the circulating pump of the filter system withdraws water from the pool, passes it through a large filter to remove any impurities, then through the heater, and then back to the pool. As this cycle continues, the filter becomes more and more clogged and fouled with foreign matter, increasing the pressure loss across the filter, and thereby reducing the pressure at which the water is supplied to the heater even though the pump output pressure remains substantially the same. The heater disclosed in my aforementioned patent is provided with one or more fixed area nozzles or orifices through which the water to be heated is supplied to the heating portion of the heater. Since any variation of the rate at which the water flows through a fixed orifice or nozzle is primarily dependent on any variation in the difference in the pressure upstream and downstream of the nozzle, and since the pressure in the heating portion of my continuous flow heater is normally rather constant, the effective supply pressure also should be maintained within a certain range in order to insure that the water will be introduced into the heater at a rate of flow falling within the range for which the heater is designed to produce the best results. In the case of my patented heater mentioned above, lowering the supply pressure may decrease the velocity of the output stream of water from the nozzles which may materially decrease the efficiency of my heater after the filter system has been in use for some time, since the heater depends upon the speed of the jets of water in order to cause turbulent flow within the heater tubes. Further, if the flow of water through the heater tubes becomes too slow, then the water may be heated to such a temperature that the deposit of minerals will be materially increased.

Since the filter becomes clogged, and therefore the pressure supplied to the heater from the downstream side of the filter becomes lower at a more or less constant rate, the period from the time at which the filter is cleaned to the time at which the supply pressure to the jets is too low to work effectively may be increased by merely causing the pump to operate at a higher output pressure. However, while such action will increase the length of time that the system will run without the filter being cleaned, the amount that the output pressure may be increased is limited by the fact that if the pressure input to the nozzles or orifices is too high, the cold water will flow into the heater tubes too fast causing the undesirable condensation mentioned above. For this reason, it has been found that the output pressure cannot be increased enough to increase the length of time between filter cleanings sufficiently. The problem also might be overcome by providing that the jets be made variable. However, variable jets, of necessity, are relatively complicated and subject to fouling as well as being expensive, and therefore are not as advantageous as my invention.

Bearing in mind the above mentioned difficulties encountered in continuous flow water heaters, it is a major object of the present invention to materially increase the efficiency of a continuous flow water heater.

It is another object of this invention to provide means which may be incorporated in a water heater which will compensate for variations in the pressure of the water supply to be heated and thereby regulate the flow of water through the heater.

A further object of this invention is to provide means on a continuous flow water heater which will bypass more water when the rate of flow of the water supply is increased in order that the flow through the heater is able to remain at a more constant rate.

Yet a further object of this invention is to provide easily maintained means for a water heater which will compensate for variations in the difference in the pressure of the water entering and the pressure of the water leaving the heater and stabilize the rate of flow through the heating portion of the heater.

It is a still further object of this invention to provide, for a continuous flow water heater, a supply pressure compensator which has variable flow means which will bypass water around the heating portion of the heater in proportion to the amount that the pressure of the water supplied to the heaters exceeds a pressure which is a predetermined amount greater than the pressure of the water in the heating portion of the heater.

A still further object of this invention is to provide, for a continuous flow fluid heater, a supply pressure compensator which has variable flow means which will bypass fluid around the heating portion of the heater in proportion to the amount that the temperature of the fluid leaving the heating portion of the heater is less than a predetermined temperature.

Another object of this invention is to provide, for a continuous flow fluid heater, a supply pressure compensator which has variable flow means which will bypass fluid around the heating portion of the heater and variably restrict the flow of fluid from the heating portion of the heater in proportion to the amount that the temperature of the fluid leaving the heater heating portion exceeds a predetermined temperature.

Other and further objects of this invention will become apparent in the detailed description below in reference to the attached drawings wherein:

FIGURE 1 is a partially cutaway perspective view of a continuous flow water heater embodying the present invention;

FIGURE 2 is an enlarged fragmentary section taken on the line 2—2 in FIGURE 1 and illustrating the flow path of the water;

FIGURE 3 is a plan view along line 3—3 in FIGURE 1;

FIGURE 4 is a fragmentary elevation, partly in section, showing the device as viewed from the aspect of arrow 4 in FIGURE 2;

FIGURE 5 is a pictorial view of the hinged plate which forms a bypass valve;

FIGURE 6 is a fragmentary elevational section taken along the line 6—6 in FIGURE 1 and discloses the details of the manner in which the bypass valve is mounted in the heater embodying the present invention;

FIGURE 7 is a cross sectional view of an alternate form of manifold member which may be used; and FIGURE 8 is an end view of the passageway connecting the inlet and exhaust chambers of the manifold member in FIGURE 7.

Referring to FIGURE 1 in the drawings, it will be seen that the heater embodying a first embodiment of the present invention is enclosed in an outer, generally rectangular sheet metal housing 10 having a refractory tile, or similarly lined internal fire box 11 mounted inwardly of it in spaced relation with rock wool insulation 12 filling the space between the outer housing and internal fire box. A heat exchanger in the form of lower and upper horizontal water tubes 13 and 14, respectively, extend longitudinally across the fire box of the heater in order that the heat from gas burners in the bottom of the fire box (not shown) may pass up around the water tubes into an interior hood 15 which directs the gases to a flue (not shown).

In order to connect the present invention with a swimming pool water circulating pump and filter, an inlet pipe 16 is provided through which the water flows in the direction shown by the arrow. From the pipe 16, the water flows into a manifold 17 and then through the heating portion of the heater, i.e., the heater tubes 13 and 14, before leaving the heater via the manifold 17 and exhaust pipe 18 which carries the heated water back to the pool. The manifold 17 may be cast of aluminum or iron and is bolted to the heater by means of a series of bolts 19. A thermostat 20 is attached to the manifold 17 in order to sense the temperature of the water therein and shut off the heater at the proper time when the incoming water reaches a predetermined temperature.

Referring to FIGURE 2, it is seen that the heater is provided with a front header 22 and a rear header 23 which has a header plate 24 removably mounted thereon in order to facilitate cleaning of the water tubes 13 and 14. The water tubes 13 and 14 are provided with a series of heat transfer fins 25 and are mounted to the headers 22 and 23, respectively, by suitable means such as brazing.

The manifold 17 is divided into an inlet chamber 26 and a distribution chamber 27 by means of a horizontally extending wall 28, which has an aperture 29 formed therein in order to provide a fluid conducting means for the water to flow from the inlet chamber 26 to the distribution chamber 27.

In order to collect any minute particles which may have been able to pass through the main filter for the swimming pool, a filter screen 30 is mounted extending through the aperture 29 by means of a threaded cap 32 which is threaded into a threaded bore 33 in the manifold 17.

A series of jet nozzles 34 are mounted axially aligned with each of the water tubes 13. The internal bore of each nozzle 34 is relatively small and produces a relatively high velocity jet of relatively cold incoming water into each of the tubes 13; the velocity being primarily a function of the amount that the pressure in the inlet chamber 26, and therefore the distribution chamber 27, exceeds the pressure in the heating portion of the heater, i.e., header 22. The kinetic energy of the injected water acts in the manner of an injector pump to draw water from the header 22 into the respective tubes 13 causing the water to circulate as indicated by the arrows. Therefore, in order to maintain the proper rate of water circulation, the pressure differential between the distribution chamber 27 and the header 22 preferable should be maintained within certain limits.

Referring now to FIGURE 3, an exhaust chamber 35 is formed within the manifold 17 and communicates with the exhaust pipe 18. The exhaust chamber 35 is separated from the inlet chamber 26 by means of a vertically extending partition 36 which has an opening in its forming a bypass passageway communicating with the inlet chamber 26 and the exhaust chamber 35. Pressure actuated bypass means are mounted across the passageway to control the flow of water directly from the inlet chamber 26 to the exhaust chamber 35. Preferably such means take the form of a spring loaded plate or door 37 hingedly mounted to a frame 38.

The details of construction of the plate or door 37 and frame 38 are best disclosed in FIGURE 5. Here it is seen that the frame 38 is provided with a pair of ears 39 and 40, and the plate 37 is hingedly mounted between these ears by means of a rod 41 which passes through bores in the ears 39 and 40 and the plate 37. The plate or door 37 has a horizontally extending lever arm 42 to receive the force of a compression spring 43 to resiliently urge the door 37 toward its closed position.

As can best be seen in FIGURE 6, the spring 43 is mounted within a tubular housing 44 which is threaded into the manifold 17, and has a cap 45 threaded onto the upper end thereof which may be adjusted upwardly or downwardly in order to vary the force with which the door 37 is urged closed. A lock nut 46 is also threaded onto the housing 44 whereby the cap 45 may be locked in the desired position after the cap is adjusted.

The exhaust chamber 35 is separated from the water within header 22 by means of a fixed plate 48 which has a nonrestrictive port 49 formed therein for delivering heated water from the heating portion of the header 22. The port 49 is formed in the plate 48 at a point therein opposite the side of the exhaust chamber where the door 37 is located, and out of the path of any flow past the door 37 in order to prevent cold water from entering the header 22 from the exhaust chamber 35. Such flow is also inhibited by the baffling effect of the door 37 which tends to direct the water flowing past the door away from the port 49. It should be noted that the port 49 is large enough that the water pressure in the exhaust chamber 35 is substantially the same as in the heating portion of the heater at the downstream side of the nozzles 34.

The plate 48 and the frame 38 are mounted to the manifold 17 by means of a bolt 50 which passes through a tab 51 on the plate 48 and a projection 52 on the frame 38, as well as through a projection 53 on the manifold 17. In order that a screw 55 may be easily installed to mount the other side of door frame 38, a threaded bore 56, adapted to receive a screwdriver therethrough, is located opposite the screw 55 and has a removable threaded plug 57 mounted therein. The above described structure has the advantage that, not only is it economical to manufacture, but the plate 37 and the exhaust chamber plate 48 may easily be removed for purposes of maintenance or replacement by simply removing the bolt 50 and screw 55.

As mentioned above, the pressure in the inlet chamber 26, and therefore the distribution chamber 27 must exceed the heater heating portion pressure by a certain predetermined amount in order to produce the optimum water velocity from the nozzles 34 for proper circulation. Therefore, the cap 45 is adjusted so that the spring 43 will hold the door 37 closed unless the pressure in the inlet chamber 26 exceeds the pressure in the exit chamber 35 by that predetermined amount. It can be seen that, due to the resiliency of the spring 43, the more that the pressure in the inlet chamber 26 tends to exceed that pressure which is a predetermined amount greater than the pressure in the exhaust chamber 35, the greater will be the bypass flow past the plate 37 directly from the inlet chamber 26 to the exhaust chamber 35 which diminishes the pressure in the inlet chamber proportionately more. In other words, the spring loaded plate 37 provides a variable flow bypass for allowing flow through the passageway in the partition 36 in proportion to the amount that the inlet chamber 26 pressure exceeds the pressure which is a predetermined amount greater than the exhaust chamber 35 pressure. With this structure, a relatively high pressure may be supplied through the inlet pipe 16 just after the swimming pool filter has been cleaned, but the pressure will be reduced before it passes to the nozzles 34 because a substantial portion of the flow will be bypassed directly into the exhaust chamber 35. Then as the filter becomes more clogged and the pressure of the water supplied through the pipe 16 becames less, a smaller portion, or none of the water will be bypassed, whereby the velocity of the water from the nozzles 34 will still be that required to cause proper circulation through the heater tubes.

The supply pressure may also be compensated for by using the temperature of the water leaving the heater heating portion to control the amount of supply water which is bypassed. FIGURE 7 discloses an embodiment of the present invention which will do this. In the second embodiment, a manifold member 58 is used which is very similar to the manifold member 17 described above and therefore only one view is deemed necessary for illustration. A thermostat 59 is mounted to the member 58 and causes the heater to start when necessary, as in the first embodiment. The water to be heated is supplied to the manifold member 58 through the inlet pipe 16 into an inlet chamber 61 where the majority of the water passes into a distribution chamber, similar to the distribution chamber 27 in the manifold member 17, through a filter 62 which is substantially the same as the filter 30 in the first modification. Then the water flows into the heating portion of the heater through several nozzles 60. At the left side of the inlet chamber 61, a partition 63 extends laterally across the manifold member 58 and has an opening 64 formed therein which provides a bypass passage through which a portion of the incoming water may bypass the heating portion of the heater. Within the bore 64 are located a series of three support arms 65 upon which an annular ring portion 66 is mounted.

In this modification, the means which are provided to exhaust the heated water from the heater include an exhaust chamber 68 which receives heated water from the heating portion of the heater through a nonrestrictive port 72 located in a plate 73. Plate 73 is very similar to the plate 48 in both its shape and the manner in which it is mounted to the manifold member 58.

Upon inspection, it can be seen, a portion of the water may pass directly from the inlet chamber 61 to the exhaust chamber 68 by means of the opening 64. In order to variably restrict the amount of water which flows through this passageway, a restricting means is mounted across this passageway. In this embodiment, the restricting means takes the form of a circular disc closure member 74 which is mounted upon a shaft 75 which in turn is slidably mounted within the annular ring portion 66.

As can be seen, as the shaft 75 is moved to the right or left, the disc 74 is moved towards or away from a seat 76 on the partition 63 around the opening 64. Thereby the amount of water which may pass through the opening passageway 64 may be controlled or regulated. For economy in manufacture, the disc 74 is mounted between two nuts which are threaded onto a threaded portion 77 on the shaft 75. Thereby the disc 74 may be easily positioned longitudinally relative to the shaft 75 for purposes of initial adjustment.

As mentioned above, in the embodiment of the invention shown in FIGURE 7, the flow restricting means are positioned in response to the temperature of the water exiting from the heating portion of the heater. Therefore, in this embodiment a positioning actuator 80 is mounted to the manifold member 58 and has the left end of the shaft 75 fixedly mounted thereon. The actuator 80, which is used, is essentially a mass of material which has a very high coefficient of expansion with change in temperature, and therefore, as it is heated, the shaft 75 is moved to the right. Conversely when the actuator 80 is cooled, the shaft 75 is moved to the left.

With the above-described arrangement, it can be seen that if the water entering the exhaust chamber 68 from the heating portion of the heater is too cold, the actuator 80 will contract moving the disc 74 to the left whereby more water will pass through the opening or passageway 64. This will cause less water to be forced through the heating portion of the heater whereby, since the heat input from the burners is substantially constant, the water exiting into the exhaust chamber 68 will become warmer. Conversely, if the water exiting from the heating portion is too hot, the actuator 80 will expand and move the shaft 75 to the right whereby the passageway 64 will be more restricted in order that more water will pass through the heating portion of the heater.

It should be noted that this embodiment of the invention works very similarly to the first embodiment of the invention described. More specifically, as mentioned in conjunction with the first embodiment, more water is supplied to the heater just after the main filter has been cleaned as mentioned above because there is less pressure drop across that main filter. At this time, more water would be forced through the heating portion of the heater whereby the water exiting through the port 72 into the exhaust chamber 68 would be colder. However, if the water temperature is less, this will cause the disc 74 to be moved to the left whereby more water may bypass the heating portion via passageway 64. Then as the cycle continues and the main filter becomes more clogged whereby the water is supplied to the inlet chamber 61 at a lower pressure due to the larger loss in pressure across the main filter, the amount of water passing through the heating portion of the heater tends to diminish. This causes the temperature of the water exiting the heating portion of the heater to tend to increase. However, the increase in temperature causes the positioning actuator 80 to expand and cause the disc 74 to restrict the bypass passageway 64, thus, forcing more water to flow into and through the heating portion of the heater which compensates for the increased pressure drop across the main filter.

The two modifications of the invention shown and described are very similar in operation, that is, each of the embodiments allow water to bypass the heating portion of the heater as a function of the rate of flow of water through the inlet means of the heater. More specifically, in the first embodiment when the rate of flow of water through the inlet means is faster than the designed amount, the difference in the water pressure in the inlet chamber and the exhaust chamber will be greater than the designed amount tending to cause the flow of water through the heating portion to be too great. The first embodinent uses this fact to open a passage to allow more water to be bypassed directly from the inlet chamber to the exhaust chamber to thereby tend to diminish the difference in pressure between the inlet and the exhaust chambers. In the second embodiment, if the rate of flow through the inlet means is too high because the pressure upstream of the heater is too much greater than the pressure downstream of the heater, the rate of flow through the heating portion of the heater will be too great. This causes the water exiting the heating portion of the heater to be too cold. The second embodiment of the invention uses this fact to open a passageway to allow more water to bypass the heating portion and pass directly from the inlet chamber to the exhaust chamber. This action reduces the rate of flow through the heating portion of the heater by diminishing the difference in the pressure between these two chambers, thereby compensating for the excessive pressure differential.

It can be seen that the present invention provides a simple inexpensive means which compensates for variations in the pressure of the water supplied to a constant flow heater relative to the pressure of the water leaving the heater. Thus, the system may be used for materially longer periods between filter cleaning without reducing heater efficiency. This result makes a heater with such means much more commercially acceptable.

While the supply pressure compensators shown and described herein are fully capable of achieving the objects and providing the advantages hereinbefore stated, they are capable of some modification without departing from the spirit of the invention. For this reason, I do not mean to be limited to the preferred forms shown and described, but rather to the scope of the appended claims.

I claim:

1. A continuous flow water heater operating under varying inlet water pressure, comprising: heat exchange means; inlet means to receive water to be heated and deliver it to said heat exchange means; exhaust means communicating with the heat exchange means for delivering heated water therefrom; means delivering products of combustion to said heat exchange means to heat water passing therethrough; built-in means independent of piping and piping connections providing a passage interconnecting said inlet means and said exhaust means to bypass said heat exchange means; and means automatically controlling the flow of water through said bypass passage to regulate the rate of flow and delivery temperature of the water passing through the heat exchange means to minimize formation of condensate on the exterior surface of the inlet portion of said heat exchange means and deposit of minerals on the interior surface of the outlet portion of said heat exchange means, thereby compensating for variations in water pressure at said inlet means.

2. A continuous flow water heater operating under varying inlet water pressure, comprising: heat exchange means; inlet means to receive water to be heated and deliver it to said heat exchange means; exhaust means communicating with the heat exchange means for delivering heated water therefrom, said inlet means and exhaust means being separated by a common wall having a port therethrough intercommunicating said means; means delivering products of combustion to said heat exchange means to heat water passing therethrough; valve means for said port; and means automatically controlling the position of said valve means to control the flow of water through said port to regulate the rate of flow and delivery temperature of the water passing through the heat exchange means to minimize formation of condensate on the exterior surface of the inlet portion of said heat exchange means and deposit of minerals on the interior surface of the outlet portion of said heat exchange means, thereby compensating for variations in water pressure at said inlet means.

3. A continuous flow water heater operating under varying inlet water pressure, comprising: heat exchange means; inlet means to receive water to be heated and deliver it to said heat exchange means; exhaust means communicating with the heat exchange means for delivering heated water therefrom, said inlet means and exhaust means being separated by a common wall having a port therethrough intercommunicating said means; means delivering products of combustion to said heat exchange means to heat water passing therethrough; valve means for said port; and means automatically controlling the position of said valve means to control the flow of water through said port to regulate the rate of flow and delivery temperature of the water passing through the heat exchange means, said automatic control means maintaining the rate of water flow through the heat exchange means low enough to minimize the portions of said heat exchange means having an exterior temperature below the dew point of said products of combustion to minimize the formation of condensate adjacent the inlet of said heat exchange means, while maintaining the rate of water flow sufficiently high to prevent a rise in temperature of the heated water adjacent the outlet portion of the heat exchange means to a temperature effecting undue deposit of minerals interiorly of the heat exchange means.

4. A continuous flow water heater as defined in claim 1, in which said automatic control means includes a movable wall portion mounted to variably restrict said passage, and positioning means for said wall portion responsive to differences in pressure on the opposite sides thereof to compensate for variations in water pressure at said inlet means.

5. A continuous flow water heater as defined in claim 1, in which said automatic control means includes a movable wall portion mounted to variably restrict said passage, and positioning means for said wall portion operating in response to the temperature of the water delivered from the heat exchange means.

References Cited in the file of this patent

UNITED STATES PATENTS

| | | |
|---|---|---|
| 1,140,910 | Metcalfe | May 25, 1915 |
| 1,180,389 | Friend | Apr. 25, 1916 |
| 2,279,285 | Worth | Apr. 7, 1942 |
| 2,446,677 | Vaughan et al. | Aug. 10, 1948 |
| 2,449,922 | Andersen | Sept. 21, 1948 |
| 2,560,245 | Ramsaur et al. | July 10, 1951 |
| 2,828,723 | Miller | Apr. 1, 1958 |
| 2,884,197 | Whittell | Apr. 28, 1959 |
| 2,903,244 | Brown | Sept. 8, 1959 |